US012737803B1

(12) United States Patent
Smith et al.

(10) Patent No.: US 12,737,803 B1
(45) Date of Patent: Sep. 15, 2026

(54) SYSTEM, METHOD, AND COMPUTER PROGRAM FOR SAVING A PRODUCT LISTING TO A PRODUCT REGISTRY BASED ON A PHOTOGRAPHIC IMAGE

(71) Applicant: Baby List, Inc., Emeryville, CA (US)

(72) Inventors: Aaron Smith, Las Vegas, NV (US); Kristen Turner, San Francisco, CA (US); Harvey Fang, Los Angeles, CA (US); Beatriz Miranda, San Francisco, CA (US)

(73) Assignee: Baby List, Inc., Emeryville, CA (US)

( * ) Notice: Subject to any disclaimer, the term of this patent is extended or adjusted under 35 U.S.C. 154(b) by 51 days.

(21) Appl. No.: 18/781,770

(22) Filed: Jul. 23, 2024

(51) Int. Cl.
*G06Q 30/0601* (2023.01)

(52) U.S. Cl.
CPC ................................ *G06Q 30/0633* (2013.01)

(58) Field of Classification Search
CPC ....... G06Q 30/0633; G06Q 30/0207–30/0277; G06Q 50/01; H04L 67/20; H04L 67/306
See application file for complete search history.

(56) References Cited

U.S. PATENT DOCUMENTS 6,611,814 B1 8/2003 Lee et al.
7,756,753 B1 7/2010 McFarland
7,877,289 B1 1/2011 Cunningham et al.
8,280,781 B1 * 10/2012 Pottier .............. G06Q 30/0601 705/26.8
8,346,625 B2 * 1/2013 Song .................. G06Q 30/0611 705/26.7
8,510,145 B2 8/2013 Rowland
8,560,401 B1 10/2013 Bharara et al.
8,612,312 B1 12/2013 Edwards et al.
8,751,281 B2 6/2014 Chaushev
9,269,103 B1 2/2016 Kumar et al.
9,787,521 B1 * 10/2017 Boynes .................. G06Q 30/06
10,650,433 B2 * 5/2020 Agarwal ............ G06Q 30/0633
10,776,750 B2 9/2020 Lindbo et al.
10,783,151 B1 9/2020 Bushkin et al.
11,244,376 B1 * 2/2022 Van Thomme .... G06Q 30/0633
(Continued)

OTHER PUBLICATIONS

Collaborative_gift_registry_in_multi-channel_retail_commerce (Year: 2005).*
(Continued)

*Primary Examiner* — Gautam Ubale
(74) *Attorney, Agent, or Firm* — Lessani Law Group, PC

(57) ABSTRACT

A product listing is saved to a product registry based on a photographic image. A client application receives a product image from a user's camera or photo library. The client application obtains a URL for the image and calls an API with the URL, where the API requests search results from an internet image searching service using the URL. A server receives search results from the internet image searching service via the API. The server compares product offers in the search results with a product database by matching a product offer in the search results to a product record in the product database based on having a same URL. The server identifies a matched product record as a product listing and sends the product listing to the client application for display. The client application displays the product listing with a call-to-action button for saving the product to the product registry.

14 Claims, 9 Drawing Sheets

(56) References Cited

U.S. PATENT DOCUMENTS 11,295,364 B1* 4/2022 Flanagan .......... G06Q 30/0611
11,743,353 B1* 8/2023 Flanagan .......... G06Q 30/0601 709/206
11,868,934 B1 1/2024 Mandal et al.
12,248,974 B1* 3/2025 Gates .................. G06F 40/20
12,340,410 B1* 6/2025 Gates .................. G06F 16/9538
2002/0133387 A1 9/2002 Wilson et al.
2003/0066093 A1 4/2003 Cruz-Rivera et al.
2003/0131021 A1 7/2003 Wight et al.
2004/0254855 A1* 12/2004 Shah .................. G06Q 30/0633 705/26.35
2007/0204308 A1 8/2007 Nicholas et al.
2007/0299736 A1 12/2007 Perrochon et al.
2008/0172304 A1* 7/2008 Berkowitz ......... G06Q 30/0633 705/26.8
2008/0288332 A1 11/2008 Altounian et al.
2009/0099941 A1* 4/2009 Berkowitz .......... G06Q 20/102 705/40
2009/0164340 A1* 6/2009 Lluch .................. G06F 16/9554 705/26.1
2009/0216549 A1 8/2009 Causey et al.
2010/0287256 A1* 11/2010 Neilio .................... G06Q 10/10 709/217
2011/0016023 A1 1/2011 Zakas
2011/0184855 A1* 7/2011 Webber .................. G06Q 40/02 705/39
2011/0185390 A1 7/2011 Faenger et al.
2011/0264460 A1 10/2011 Jagemann et al.
2011/0320437 A1 12/2011 Kim et al.
2012/0030067 A1 2/2012 Pothukuchi et al.
2012/0150882 A1 6/2012 Deutsch
2013/0024452 A1 1/2013 Defusco et al.
2013/0031017 A1 1/2013 LaVoie et al.
2013/0054404 A1 2/2013 Garcia
2013/0117151 A1 5/2013 Macaisa et al.
2014/0012765 A1 1/2014 Kruglick
2014/0019267 A1 1/2014 Stoliartchouk et al.
2014/0279207 A1 9/2014 Agarwal et al.
2014/0358662 A1 12/2014 De Luca
2015/0149298 A1 5/2015 Tapley
2016/0042438 A1* 2/2016 Robertson .......... G06Q 30/0633 705/26.8
2016/0140519 A1 5/2016 Trepca et al.
2016/0188606 A1 6/2016 Bandyopadhyay et al.
2016/0188725 A1 6/2016 Wang et al.
2016/0328787 A1* 11/2016 Szulczewski ...... G06Q 30/0643
2017/0039578 A1 2/2017 Woddi et al.
2017/0076349 A1 3/2017 Rohach Miller et al.
2017/0098284 A1* 4/2017 Schneider .............. G06Q 10/40
2017/0193591 A1 7/2017 Narasimhan et al.
2017/0206500 A1 7/2017 Deshpande et al.
2017/0270572 A1* 9/2017 Schydlowsky ..... G06F 16/9535
2018/0005304 A1* 1/2018 Amacker ........... G06Q 30/0633
2018/0181873 A1 6/2018 Chen
2018/0240066 A1 8/2018 Streebin et al.
2018/0314999 A1 11/2018 Nemati et al.
2019/0057145 A1 2/2019 Huang et al.
2019/0080307 A1* 3/2019 Katzin ................ G06Q 20/386
2020/0410025 A1 12/2020 Arunmozhi et al.
2021/0166061 A1* 6/2021 Tapley ............... G06Q 30/0601
2022/0114868 A1 4/2022 Bronicki et al.
2023/0121779 A1* 4/2023 Quigley ........... G06Q 20/38215 705/65
2023/0196341 A1* 6/2023 Quigley ............ G06Q 30/0631 705/65
2023/0214910 A1* 7/2023 Vacante ............ G06Q 30/0641 705/27.1
2023/0245055 A1 8/2023 Kang et al.
2023/0281672 A1* 9/2023 Kobayashi ......... G06Q 30/0272 705/14.71
2024/0029011 A1 1/2024 Stroh et al.
2024/0070603 A1 2/2024 Putrevu et al.
2024/0354635 A1 10/2024 Davaloo et al.
2024/0362583 A1* 10/2024 Natarajan ............ G06Q 10/087

OTHER PUBLICATIONS

AI_Driven_E__Commerce_Product_Recommendation (Year: 2023).*
Pathak, Bhavik K. "Comparison Shopping Agents and Online Price Dispersion: A Search Cost based Explanation", Journal of Theoretical and Applied Electronic Commerce Research, vol. 7, Issue 1, Apr. 2012, pp. 64-76.
zola.com, FAQs (registry, receiving gifts): "How and when will we actually receive our gifts at home?", Jun. 1, 2023, 1 page.
Team Hopstack "Top 24 Warehouse KPIs & Metrics to Track in 2025", Jun. 7, 2023 (available at: https://www.hopstack.io/blog/warehouse-metrics-kpis) (Year: 2023), 13 pages.
Niu, Xi et al., "Predictive Analytics of E-Commerce Search Behavior for Conversion", Twenty-third Americas Conference on Information Systems, 2017, pp. 1-10.

* cited by examiner

SYSTEM, METHOD, AND COMPUTER PROGRAM FOR SAVING A PRODUCT LISTING TO A PRODUCT REGISTRY BASED ON A PHOTOGRAPHIC IMAGE

BACKGROUND OF THE INVENTION

1. Field of the Invention

This invention relates generally to registry systems and, more specifically, to a system and method for saving a product listing to a product registry based on a photographic image.

2. Description of the Background Art

In shopping for products, a user sometimes wishes to add an item to a wish list or gift registry that is not in a store or online. For example, the user may encounter the product at a park or a friend's house. While the user can GOOGLE the product or attempt to enter product information into a wish list, this would take time and the user may not have sufficient product information (e.g., the user may not know the name of the product and/or the product may not have any distinctive universal product code (UPC) or stock-keeping unit (SKU)). Therefore, there is a need for a system and method that enables a user to add a product to a wish list or product registry simply by taking a photo of the product.

The present invention allows a user to take a photo of any product and then receive both exact and similar product results from any online retailer, which can then be added to the user's wish list or product registry. Not only does this create a path for both direct search and product discovery, but it also provides a highly efficient method for interfacing with the user's product registry, especially in cases where a user does not have sufficient product information.

SUMMARY OF THE DISCLOSURE

The present disclosure describes a system, method, and computer program for saving a product listing to a product registry based on a photographic image. The method is performed by a computer system that includes servers, storage systems, networks, operating systems, and databases.

The present disclosure enables a user to pick a photographic image from the user's camera or photo library. The system uploads the image to a third-party service, for example, an image hosting service, to generate a public uniform resource locator (URL) for the image. The system then calls a first application programming interface (API) that interfaces with the registry system with the URL, which in turn calls a second API (e.g., a search engine results page (SERP) API) that interfaces with an internet image searching service (e.g., GOOGLE LENS). The internet image searching service provides search results for the image (e.g., as a JSON response), where the product offers in the search results are matched to product records in a product database based on having the same URLs. In certain embodiments, the system then filters the search results for duplicates, creates consolidated product listings by grouping multiple merchant offers, ranks the consolidated product listings based on sales volume data of the primary retailer in each consolidated product listing, and sorts the consolidated product listings for display in a user interface with a call-to-action button for adding the product to a product registry.

In one embodiment, a method for saving a product listing to a product registry based on a photographic image comprises the following steps:

- a client application receiving an image of a product from a user's camera or photo library;
- the client application obtaining a URL for the image;
- the client application calling a first API with the URL for the image, wherein the first API requests search results from an internet image searching service using the URL for the image;
- a server receiving search results from the internet image searching service via the first API, wherein the server has a product database that comprises a plurality of product records, wherein each product record is associated with one or more merchant offer records, and wherein the search results comprise one or more product offers;
- the server comparing the one or more product offers in the search results with the product database by matching a product offer in the search results to a product record in the product database, or a merchant offer record associated with the product record, based on the product offer and matched product record or matched merchant offer record having a same URL, wherein the server identifies the matched product record or product record associated with the matched merchant offer record as a product listing;
- in response to the server finding a match between the product offer in the search results and the product record in the product database, or the merchant offer record associated with the product record, performing the following:
  - the server sending the product listing to the client application for display, and the client application displaying the product listing, wherein the product listing has a call-to-action button for saving the product to the product registry; and
- in response to the server not finding a match between the product offer in the search results and any product record or merchant offer record in the product database, performing the following:
  - returning the search results to the client application for display, and
  - the client application displaying the search results, wherein the search results have a call-to-action button for saving a product in the search results to the product registry.

DETAILED DESCRIPTION OF THE PREFERRED EMBODIMENTS

The present disclosure describes a system, method, and computer program for saving a product listing to a product registry based on a photographic image. The present disclosure includes product registries (e.g., wedding registries and baby registries) as well as lists (e.g., wish lists, etc.). The method is performed by a computer system that includes servers, storage systems, networks, operating systems, and databases ("the system").

A product listing is saved to a product registry based on a photographic image. A client application receives a product image from a user's camera or photo library. The client application obtains a URL for the image and calls an API with the URL, where the API requests search results from an internet image searching service using the URL. A server receives search results from the internet image searching service via the API. The server compares product offers in the search results with a product database by matching a product offer in the search results to a product record in the product database based on having a same URL. The server identifies a matched product record as a product listing and sends the product listing to the client application for display. The client application displays the product listing with a call-to-action button for saving the product to the product registry.

Example implementations of the methods are described in more detail with respect to FIGS. 1-6C.

1. Example System Architecture

Figure 1:
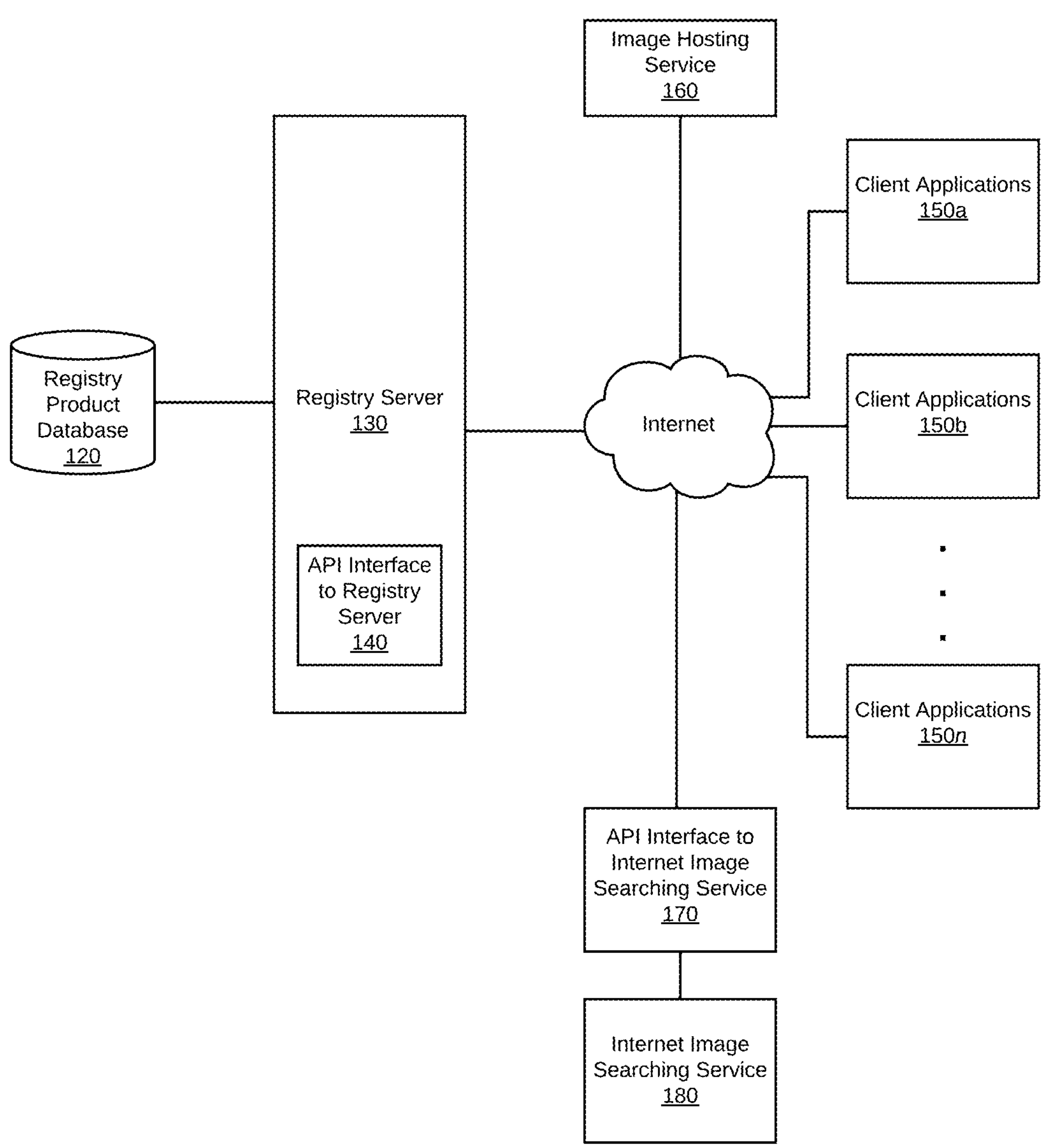
FIG. 1 is a block diagram that illustrates an example software architecture according to one embodiment.

FIG. 1 illustrates an example architecture for a system that performs the methods described herein. However, the methods described herein may be implemented in other systems and are not limited to the system illustrated in FIG. 1. The registry product database 120 stores all the products that have been added to users' registries from merchant sites. The registry server 130 performs the methods described below for saving a product listing to a product registry based on a photographic image as discussed in greater detail with respect to FIGS. 3A-5. The registry server 130 has an API 140 to the registry server 130 that enables one or more client applications **150*a*-150*n* to communicate with the registry server 130** over the internet.

In certain embodiments, the one or more client applications **150*a*-150*n* obtain a URL for the image by sending the image to an image hosting service 160 to generate a public URL for the image. In certain embodiments, the API 140 to the registry server 130 calls an API 170 to an internet image searching service 180 with the URL for the image. The API 170 interfaces with the internet image searching service 180 and receives search results back from the internet image searching service 180. In certain embodiments, the API 140 to the registry server 130 communicates directly with the internet image searching service 180 without need for the API 170 to the internet image searching service 180**.

2. Example Database Architecture

Figure 2:
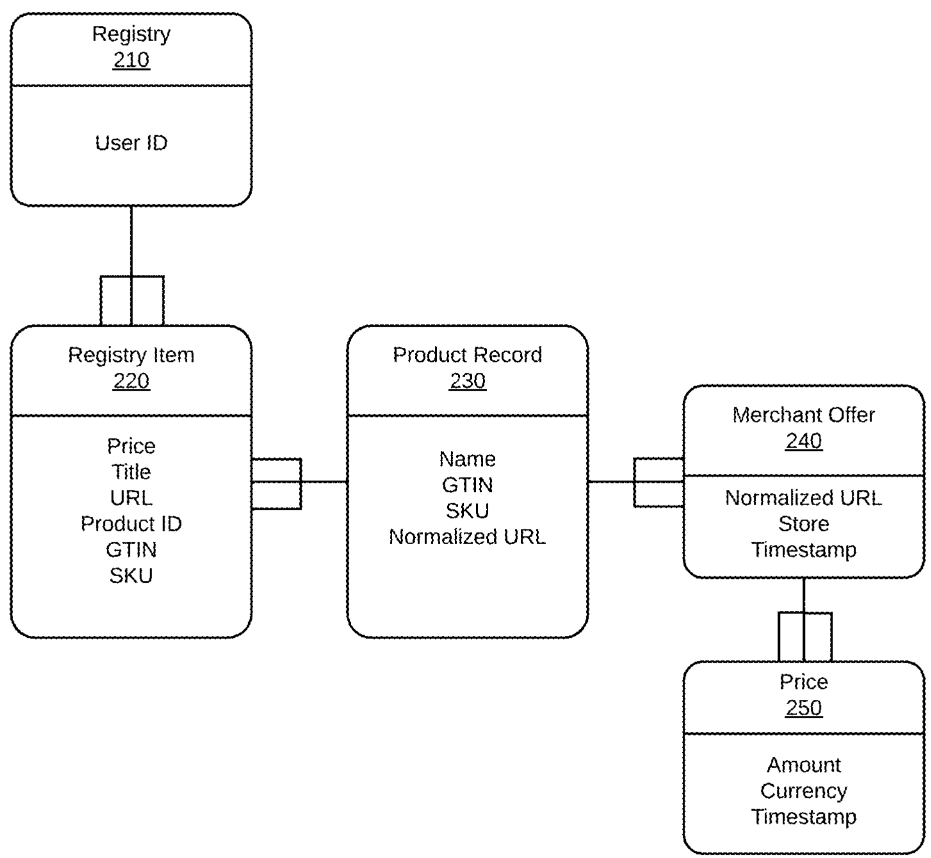
FIG. 2 is a diagram that illustrates an example architecture for a database according to one embodiment.

FIG. 2 illustrates an example architecture for a database (e.g., database 120) according to the methods described herein. However, the methods described herein may be implemented in other databases and are not limited to the database architecture illustrated in FIG. 2. Database 120 stores a plurality of record types. For example, a registry record 210 (which may include user identification information of the user who created the registry), a registry item record 220 (which may include the price, title, URL, product identification, global trade item number (GTIN), and SKU related to an item added to the user's registry), a product record 230 (which may include the name, GTIN, SKU, and normalized URL of a product), a merchant offer record 240 (which may include the normalized URL and store related to a merchant offer and a timestamp for when the merchant offer record 240 was created or most recently updated), and a price record 250 (which may include an amount and currency of the price of a product related to the merchant offer 240 and a timestamp for when the price record 250 was created or most recently updated).

As illustrated in FIG. 2, the records in database 120 have a one-to-many relationship. For example, one registry record 210 may be linked to a plurality of registry items 220. A product may have been added to a plurality of user registries and, as a result, one product record 230 may be linked to a plurality of registry item records 220 for a plurality of registry records 210. Many merchants may be selling the same product and, as a result, one product record 230 may be linked to a plurality of merchant offer records 240. Each merchant offer record 240 may be linked to a plurality of price records 250, which represents the price history of an item offered by the merchant, where the most recent price record 250 reflects the current price offered by the merchant.

Figure 3A:
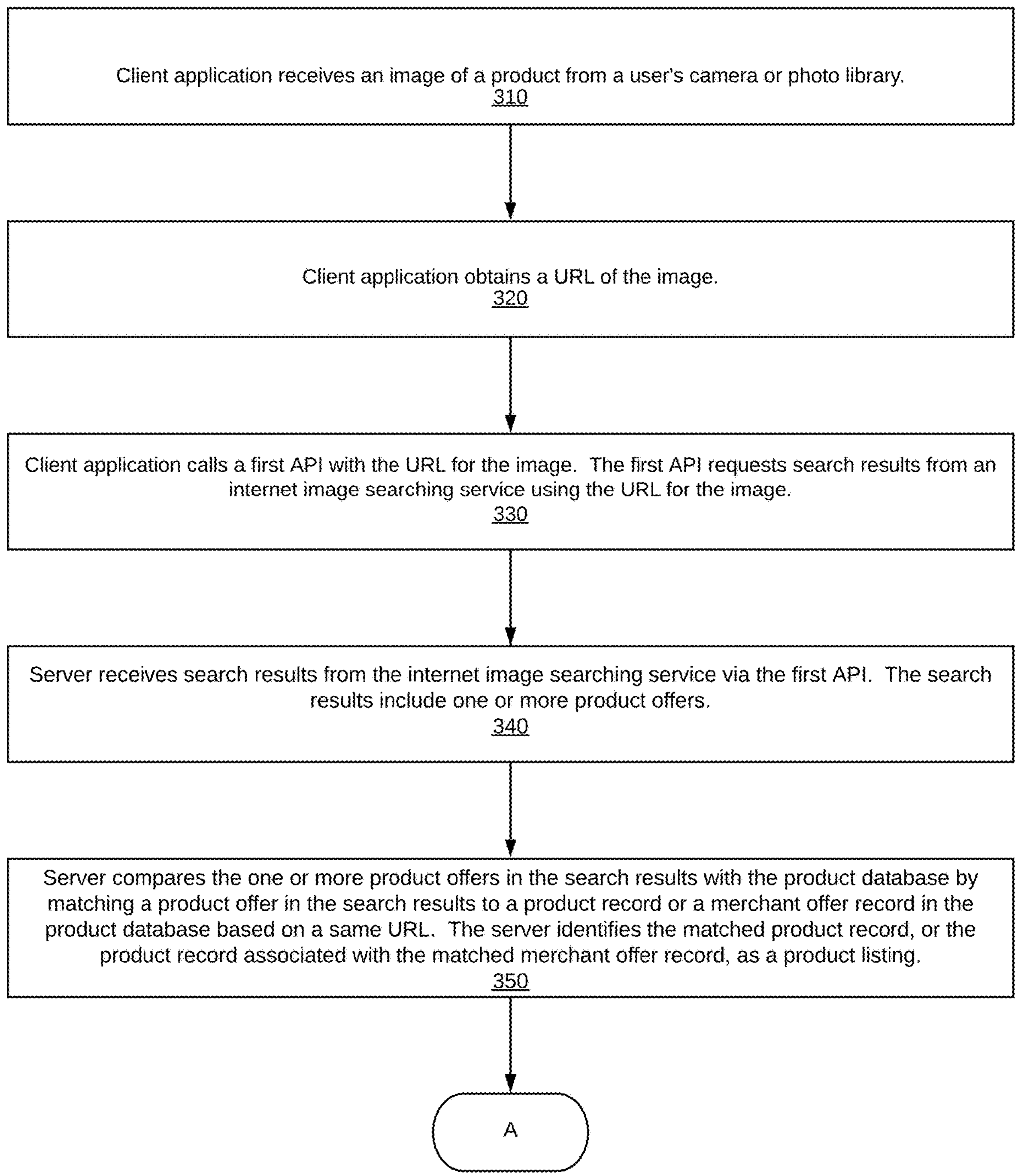
FIGS. 3A-3B are flowcharts that illustrate a method, according to one embodiment, for saving a product listing to a product registry based on a photographic image.
Figure 3B:
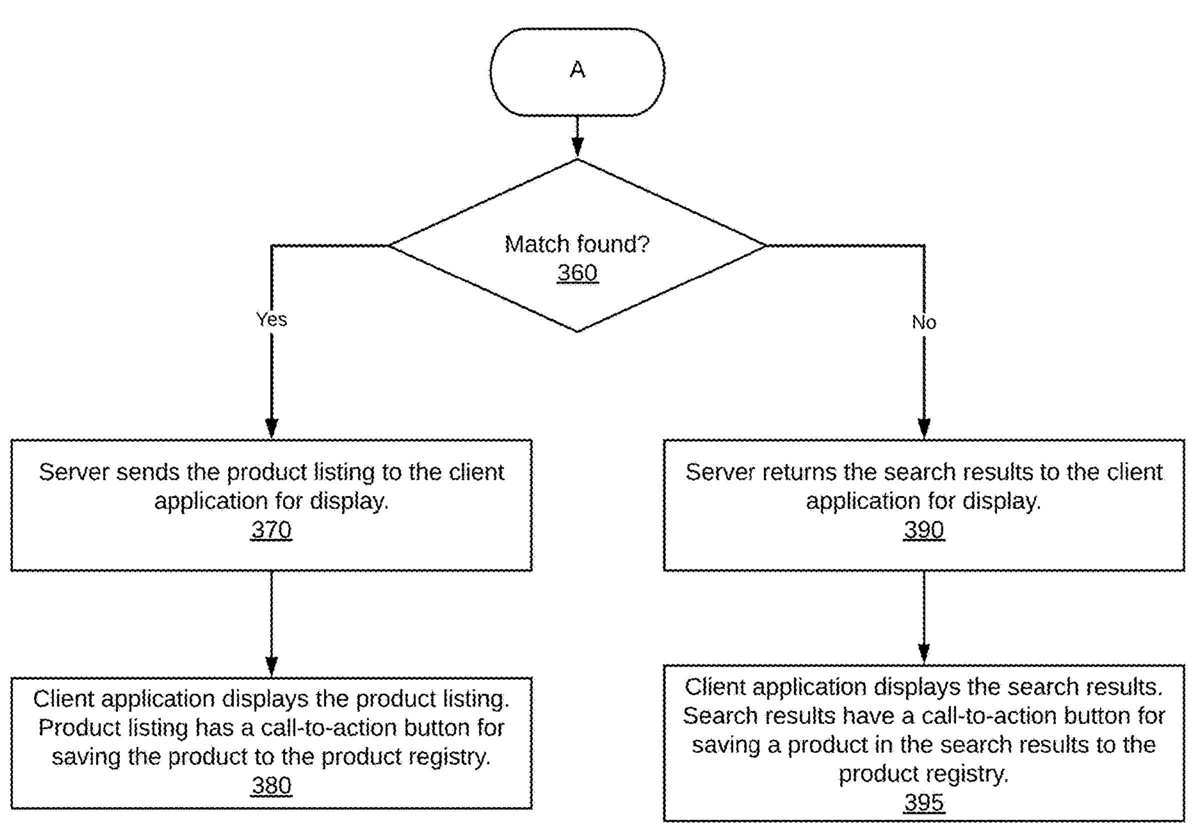

3. Method for Saving a Product Listing to a Product Registry Based on a Photographic Image FIGS. 3A-3B illustrate a method, according to one embodiment, for saving a product listing to a product registry based on a photographic image. A client application receives an image of a product from a user's camera or photo library (step 310). The client application obtains a URL of the image (step 320). In certain embodiments, the URL is a public URL. In certain embodiments, obtaining the URL for the image includes sending the image to an image hosting service to generate a public URL for the image.

The client application calls a first API with the URL for the image, where the first API requests search results from an internet image searching service using the URL for the image (step 330). In certain embodiments, the first API calls a second API with the URL for the image, and the second API interfaces with the internet image searching service and receives search results back from the internet image searching service.

A server receives search results from the internet image searching service via the first API (step 340). The server has a product database that includes a plurality of product records. Each product record is associated with one or more merchant offer records. The search results include one or more product offers. In certain embodiments, the search results may include a merchant's own products and/or third-party products.

The server compares the one or more product offers in the search results with the product database by matching a product offer in the search results to a product record in the product database, or a merchant offer record associated with the product record, based on the product offer and matched product record or matched merchant offer record having a same URL, where the server identifies the matched product record, or the product record associated with the matched merchant offer record, as a product listing (step 350).

In certain embodiments, the server comparing the one or more product offers in the search results with the product database includes the server removing any search results that are not product offers (e.g., search results that do not have a price). In certain embodiments, the server comparing the one or more product offers in the search results with the product database includes the server normalizing the URL for the product offers. In certain embodiments, in addition to comparing the one or more product offers in the search results with the product database, the system also scrapes the web page containing the search results to extract additional product data. In certain embodiments, the server processes a limited number of search results (e.g., the first page of search results).

If a match is found (step 360), the server sends the product listing to the client application for display (step 370) and the client application displays the product listing, where the product listing has a call-to-action button for saving the product to the product registry (step 380). If a match is not found (step 360), the server returns the search results to the client application for display (step 390) and the client application displays the search results, where the search results have a call-to-action button for saving a product in the search results to the product registry (step 395). In certain embodiments, when an end user saves a product in the search results to the product registry, the system will create a registry item record 220 for the product. In certain embodiments where the product is not already in the product database, the system will also subsequently create a product record 230, a merchant offer record 240, and a price record 250 for the product.

In certain embodiments, after the system saves the product to the product registry, the system updates the product database with the one or more product offers in the search results, where updating the product database includes creating new product records and/or merchant offer records or updating existing product records and/or merchant offer records. As noted above, in the embodiment where the system scrapes the web page containing the search results to extract additional product data, the extracted additional product data may also be used to update the product database.

For further details regarding product matching, please see U.S. patent application Ser. No. 16/719,677, filed on Dec. 18, 2019, which issued as U.S. Pat. No. 11,295,364 on Apr. 5, 2022, entitled "System, Method, and Computer-Readable Medium for Matching Products across Merchants and Updating Registries Based on Other User's Actions," which is incorporated by reference as if fully disclosed herein.

Figure 4:
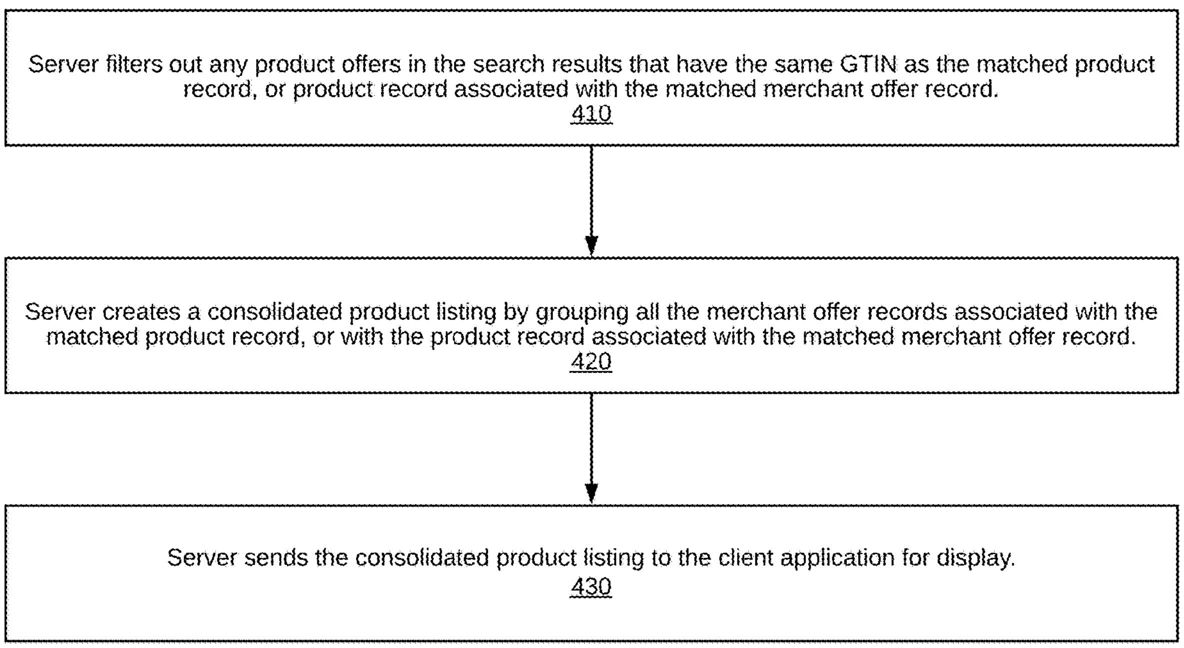
FIG. 4 is a flowchart that illustrate a method, according to one embodiment, for filtering duplicate product offers and consolidating product listings.

4. Method for Filtering Duplicate Product Offers and Consolidating Product Listings FIG. 4 illustrates a method, according to one embodiment, for filtering duplicate product offers (i.e., same product/same retailer) and consolidating product listings (i.e., same product/different retailers). The server filters out any product offers in the search results that have the same GTIN as the matched product record, or product record associated with the matched merchant offer record (step 410). The server creates a consolidated product listing by grouping all the merchant offer records associated with the matched product record, or associated with the product record associated with the matched merchant offer record (step 420). The server sends the consolidated product listing to the client application for display (step 430).

In certain embodiments, the system performs either the method for filtering duplicate product offers or the method for consolidating product listings. In certain embodiments, the system performs both the method for filtering duplicate product offers and the method for consolidating product listings.

Figure 5:
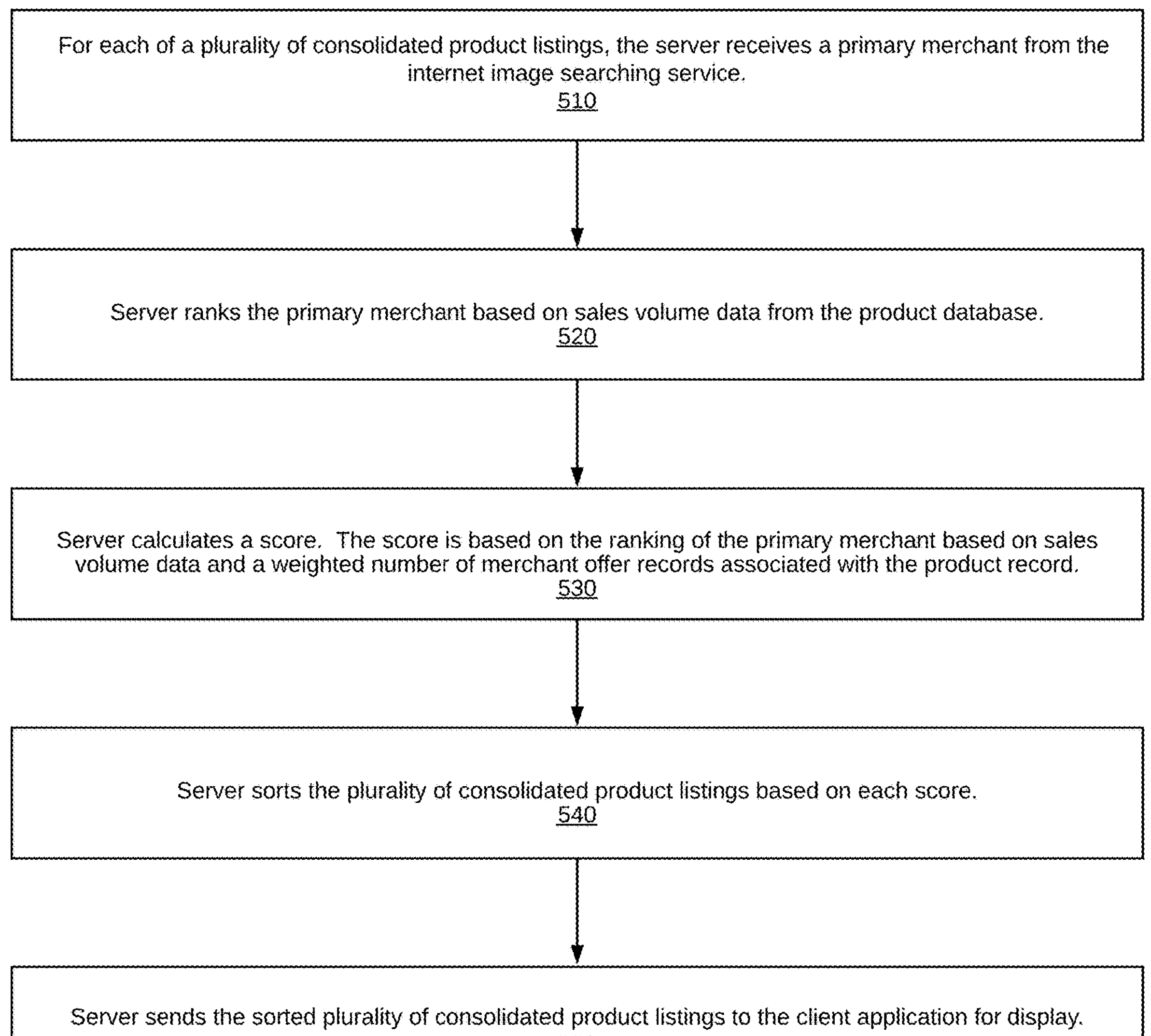
FIG. 5 is a flowchart that illustrate a method, according to one embodiment, for ranking and sorting the plurality of consolidated product listings.

5. Method for Ranking and Sorting the Plurality of Consolidated Product Listings FIG. 5 illustrates a method, according to one embodiment, for ranking and sorting the plurality of consolidated product listings. For each of a plurality of consolidated product listings, the server receives a primary merchant from the internet image searching service (step 510). The server ranks the primary merchant based on sales volume data from the product database (step 520). The server calculates a score, where the score is based on the ranking of the primary merchant based on sales volume data and a weighted number of merchant offer records associated with the product record (step 530). In certain embodiments, the score equals the sum of the store ranking by sales and the number of offers weighted by a multiple (e.g., a multiple of ten). The server sorts the plurality of consolidated product listings based on each score (step 540). The server sends the sorted plurality of consolidated product listings to the client application for display (step 550).

6. Example Screenshots

Figure 6A:
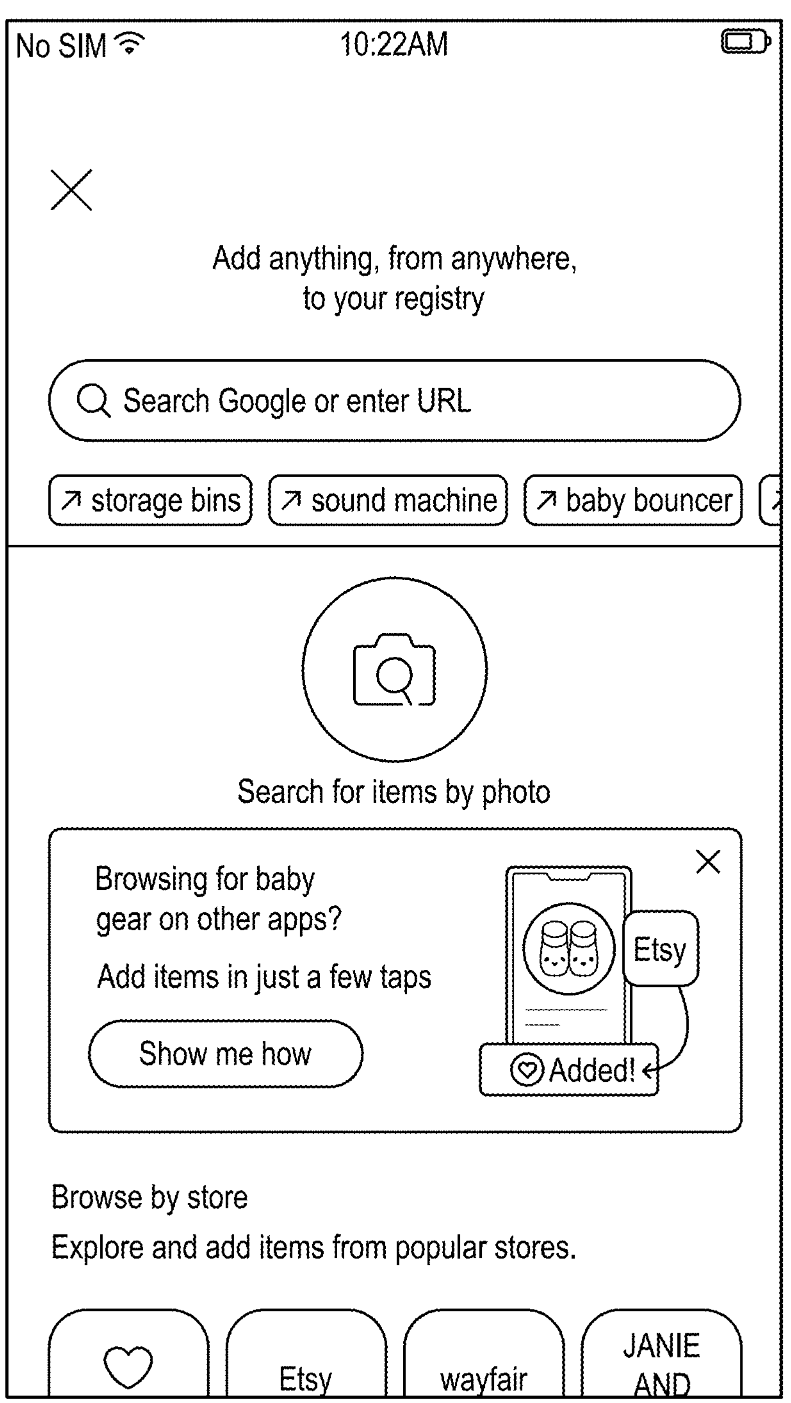
FIGS. 6A-6C are screenshots that illustrate an exemplary user interface according to one embodiment.
Figure 6B:
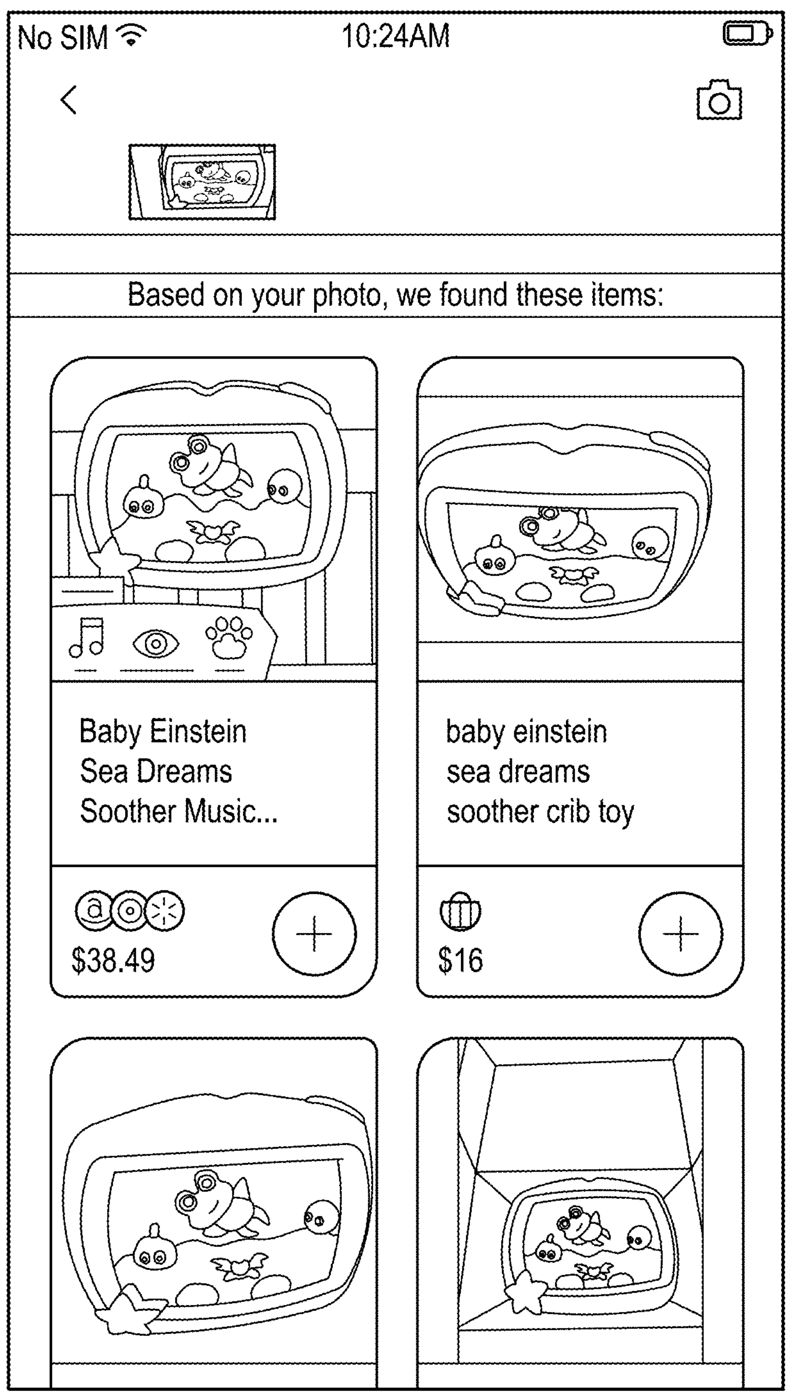
Figure 6C:
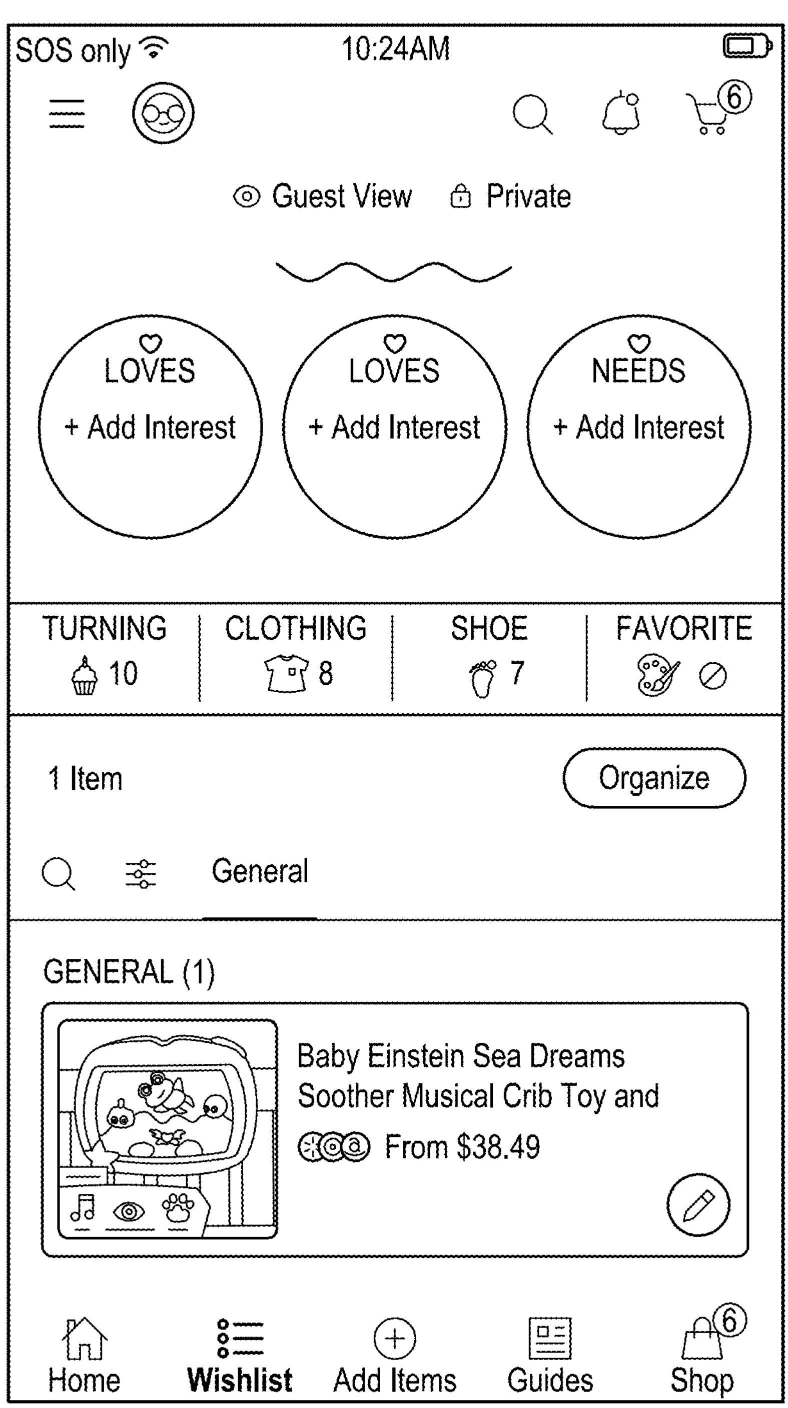

FIGS. 6A-6C are screenshots that illustrate an exemplary user interface according to one embodiment. FIG. 6A illustrates a user interface of a mobile application, which enables a user to select and search for items by photo (either through the user's camera or photo library). FIG. 6B illustrates a user interface in a mobile application, which displays the search results after the user searched for items by photo. The search results include a plurality of product listings, where each product listing indicates which merchant(s) are selling the product, the lowest price offered, and a call-to-action button for adding the product to the user's product registry. FIG. 6C illustrates a user interface in a mobile application, in which a product listing has been added to the user's product registry. The product listing indicates which merchants are selling the product and the lowest price offered. If an end user of the product registry selects the product listing, the end user has an option to purchase the product from one of the merchants selling the product at the price offered by the merchant.

7. General

The methods described with respect to FIGS. 1-6C are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for saving a product listing to a product registry based on a photographic image, the method comprising:

a client application receiving an image of a product from a user's camera or photo library;

the client application obtaining a uniform resource locator (URL) for the image;

the client application calling a first application programming interface (API) with the URL for the image, wherein the first API requests search results from an internet image searching service using the URL for the image;

a server receiving search results from the internet image searching service via the first API, wherein the server has a product database that comprises a plurality of product records, wherein each product record is associated with one or more merchant offer records, and wherein the search results comprise one or more product offers;

the server comparing the one or more product offers in the search results with the product database by matching a product offer in the search results to a product record in the product database based on the product offer and matched product record having a same URL, wherein the server identifies the matched product record as a product listing, wherein the server comparing the one or more product offers in the search results with the product database further comprises:

the server filtering out any product offers in the search results that have the same GTIN as the matched product record; and the server creating a consolidated product listing by grouping all the merchant offer records associated with the matched product record;

in response to the server finding a match between the product offer in the search results and the product record in the product database, performing the following:

the server sending the consolidated product listing to the client application for display, and the client application displaying the consolidated product listing, wherein the consolidated product listing has a call-to-action button for saving the product to the product registry, wherein for a plurality of consolidated product listings, displaying the consolidated product listing further comprises:

for each of a plurality of consolidated product listings:

the server receiving a primary merchant from the internet image searching service, the server ranking the primary merchant based on sales volume data from the product database, and the server calculating a score, wherein the score is based on the ranking of the primary merchant based on sales volume data and a weighted number of merchant offer records associated with the product record;

the server sorting the plurality of consolidated product listings based on each score; and the server sending the sorted plurality of consolidated product listings to the client application for display; and in response to the server not finding a match between the product offer in the search results and any product record in the product database, performing the following:

returning the search results to the client application for display, and the client application displaying the search results, wherein the search results have a call-to-action button for saving a product in the search results to the product registry.

2. The method of claim 1, wherein the URL is a public URL, and obtaining the URL for the image comprises sending the image to an image hosting service to generate a public URL for the image.

3. The method of claim 1, further comprising a second API, wherein the first API calls the second API with the URL for the image, and the second API interfaces with the internet image searching service and receives search results back from the internet image searching service.

4. The method of claim 1, wherein the server comparing the one or more product offers in the search results with the product database further comprises:

the server removing any search results that are not product offers.

5. The method of claim 1, wherein the server comparing the one or more product offers in the search results with the product database further comprises:

the server normalizing the URL for the product offers.

6. The method of claim 1, further comprising updating the product database with the one or more product offers in the search results, wherein updating the product database comprises creating new product records and/or merchant offer records or updating existing product records and/or merchant offer records.

7. A non-transitory computer-readable medium comprising a computer program, that, when executed by a computer system, enables the computer system to perform the following steps for saving a product listing to a product registry based on a photographic image, the steps comprising:

a client application receiving an image of a product from a user's camera or photo library;

the client application obtaining a uniform resource locator (URL) for the image;

the client application calling a first application programming interface (API) with the URL for the image, wherein the first API requests search results from an internet image searching service using the URL for the image;

a server receiving search results from the internet image searching service via the first API, wherein the server has a product database that comprises a plurality of product records, wherein each product record is associated with one or more merchant offer records, and wherein the search results comprise one or more product offers;

the server comparing the one or more product offers in the search results with the product database by matching a product offer in the search results to a product record in the product database based on the product offer and matched product record having a same URL, wherein the server identifies the matched product record as a product listing, wherein the server comparing the one or more product offers in the search results with the product database further comprises:

the server filtering out any product offers in the search results that have the same GTIN as the matched product record; and the server creating a consolidated product listing by grouping all the merchant offer records associated with the matched product record;

in response to the server finding a match between the product offer in the search results and the product record in the product database, performing the following:

the server sending the consolidated product listing to the client application for display, and the client application displaying the consolidated product listing, wherein the consolidated product listing has a call-to-action button for saving the product to the product registry, wherein for a plurality of consolidated product listings, displaying the consolidated product listing further comprises:

for each of a plurality of consolidated product listings:

the server receiving a primary merchant from the internet image searching service, the server ranking the primary merchant based on sales volume data from the product database, and the server calculating a score, wherein the score is based on the ranking of the primary merchant based on sales volume data and a weighted number of merchant offer records associated with the product record;

the server sorting the plurality of consolidated product listings based on each score; and the server sending the sorted plurality of consolidated product listings to the client application for display; and in response to the server not finding a match between the product offer in the search results and any product record in the product database, performing the following:

returning the search results to the client application for display, and the client application displaying the search results, wherein the search results have a call-to-action button for saving a product in the search results to the product registry.

8. The non-transitory computer-readable medium of claim 7, further comprising a second API, wherein the first API calls the second API with the URL for the image, and the second API interfaces with the internet image searching service and receives search results back from the internet image searching service.

9. The non-transitory computer-readable medium of claim 7, wherein the server comparing the one or more product offers in the search results with the product database further comprises:

the server normalizing the URL for the product offers.

10. The non-transitory computer-readable medium of claim 7, further comprising updating the product database with the one or more product offers in the search results, wherein updating the product database comprises creating new product records and/or merchant offer records or updating existing product records and/or merchant offer records.

11. A computer system for saving a product listing to a product registry based on a photographic image, the system comprising:

one or more processors;

one or more memory units coupled to the one or more processors, wherein the one or more memory units store instructions that, when executed by the one or more processors, cause the system to perform the operations of:

a client application receiving an image of a product from a user's camera or photo library;

the client application obtaining a uniform resource locator (URL) for the image;

the client application calling a first application programming interface (API) with the URL for the image, wherein the first API requests search results from an internet image searching service using the URL for the image;

a server receiving search results from the internet image searching service via the first API, wherein the server has a product database that comprises a plurality of product records, wherein each product record is associated with one or more merchant offer records, and wherein the search results comprise one or more product offers;

the server comparing the one or more product offers in the search results with the product database by matching a product offer in the search results to a product record in the product database based on the product offer and matched product record having a same URL, wherein the server identifies the matched product record as a product listing, wherein the server comparing the one or more product offers in the search results with the product database further comprises:

the server filtering out any product offers in the search results that have the same GTIN as the matched product record; and the server creating a consolidated product listing by grouping all the merchant offer records associated with the matched product record;

in response to the server finding a match between the product offer in the search results and the product record in the product database, performing the following:

the server sending the consolidated product listing to the client application for display, and the client application displaying the consolidated product listing, wherein the consolidated product listing has a call-to-action button for saving the product to the product registry, wherein for a plurality of consolidated product listings, displaying the consolidated product listing further comprises:

for each of a plurality of consolidated product listings:

the server receiving a primary merchant from the internet image searching service, the server ranking the primary merchant based on sales volume data from the product database, and the server calculating a score, wherein the score is based on the ranking of the primary merchant based on sales volume data and a weighted number of merchant offer records associated with the product record;

the server sorting the plurality of consolidated product listings based on each score; and the server sending the sorted plurality of consolidated product listings to the client application for display; and in response to the server not finding a match between the product offer in the search results and any product record in the product database, performing the following:

returning the search results to the client application for display, and the client application displaying the search results, wherein the search results have a call-to-action button for saving a product in the search results to the product registry.

12. The computer system of claim 11, further comprising a second API, wherein the first API calls the second API with the URL for the image, and the second API interfaces with the internet image searching service and receives search results back from the internet image searching service.

13. The computer system of claim 11, wherein the server comparing the one or more product offers in the search results with the product database further comprises:

the server normalizing the URL for the product offers.

14. The computer system of claim 11, further comprising updating the product database with the one or more product offers in the search results, wherein updating the product database comprises creating new product records and/or merchant offer records or updating existing product records and/or merchant offer records.

* * * * *